(12) United States Patent
Crisman et al.

(10) Patent No.: US 9,619,157 B2
(45) Date of Patent: Apr. 11, 2017

(54) HIGH-SPEED DATA STORAGE

(71) Applicant: ANALYSIS SOLUTION LLC, Austin, TX (US)

(72) Inventors: Jayson B. Crisman, Austin, TX (US); Ray D. Tompkins, Austin, TX (US)

(73) Assignee: ANALYSIS SOLUTION LLC, Austin, TX (US)

( * ) Notice: Subject to any disclaimer, the term of this patent is extended or adjusted under 35 U.S.C. 154(b) by 143 days.

(21) Appl. No.: 14/244,414

(22) Filed: Apr. 3, 2014

(65) Prior Publication Data

US 2015/0286420 A1 Oct. 8, 2015

(51) Int. Cl.
*G06F 3/06* (2006.01)

(52) U.S. Cl.
CPC ............ *G06F 3/0613* (2013.01); *G06F 3/061* (2013.01); *G06F 3/064* (2013.01); *G06F 3/0655* (2013.01); *G06F 3/0674* (2013.01); *G06F 3/0677* (2013.01); *G06F 3/0689* (2013.01)

(58) Field of Classification Search
CPC .... G06F 3/0601; G06F 3/0676; G06F 3/0689; G06F 3/0659; G06F 3/0613
See application file for complete search history.

(56) References Cited

U.S. PATENT DOCUMENTS

| 4,727,528 A | * | 2/1988 | Wyland | G11B 7/08 360/78.14 |
| 5,263,145 A | * | 11/1993 | Brady | G06F 3/0601 711/114 |
| 5,379,385 A | * | 1/1995 | Shomler | G06F 3/0601 710/38 |
| 5,390,315 A | * | 2/1995 | Blandy | G06F 3/0601 707/999.202 |

(Continued)

FOREIGN PATENT DOCUMENTS

WO WO 2007/110577 A1 10/2007

OTHER PUBLICATIONS

International Search Report for Application No. PCT/US2015/023861, mailed Jun. 22, 2015 (4 pages).

(Continued)

*Primary Examiner* — Shawn X Gu
*Assistant Examiner* — Jean Edouard
(74) *Attorney, Agent, or Firm* — Meyertons Hood Kivlin Kowert & Goetzel, P.C.; Jeffrey C. Hood; Mark S. Williams

(57) ABSTRACT

System and method for high speed data storage. An unmounted unformatted direct access storage device (DASD) may be opened via an operation system (OS) application programming interface (API). A maximum amount of storage space afforded by the DASD may be determined, and the DASD locked, thereby limiting write access to the DASD to a first application process and (Continued)

excluding writes to the DASD by any other application process. A single data type data stream is received, and stored on the DASD in linear fashion as it is received without using a file system architecture, metadata, indices, or keys associated with the data, including writing a block of the stream of data to the DASD and returning a next contiguous write location on the DASD in an iterative manner. The stored data are readable by multiple readers in a linear manner without using the file system architecture, metadata, indices, or keys.

21 Claims, 10 Drawing Sheets

(56) References Cited

U.S. PATENT DOCUMENTS

| | | | | |
|---|---|---|---|---|
| 5,440,745 | A * | 8/1995 | Platte | G06F 17/211 |
| | | | | 718/101 |
| 5,442,752 | A * | 8/1995 | Styczinski | G06F 3/0601 |
| | | | | 711/114 |
| 5,459,853 | A * | 10/1995 | Best | G06F 3/0601 |
| | | | | 711/111 |
| 5,493,668 | A * | 2/1996 | Elko | G06F 12/0868 |
| | | | | 711/113 |
| 5,506,979 | A * | 4/1996 | Menon | G06F 11/1008 |
| | | | | 711/112 |
| 5,537,578 | A * | 7/1996 | Day, III | G06F 3/0601 |
| | | | | 711/112 |
| 5,613,085 | A * | 3/1997 | Lee | G06F 3/0601 |
| | | | | 711/114 |
| 6,339,793 | B1 * | 1/2002 | Bostian | G06F 17/30067 |
| | | | | 707/999.009 |
| 6,470,421 | B1 * | 10/2002 | Bui | G06F 3/061 |
| | | | | 360/48 |
| 6,978,325 | B2 * | 12/2005 | Gibble | G06F 3/0605 |
| | | | | 710/33 |
| 7,509,453 | B2 * | 3/2009 | Green | G06F 3/0605 |
| | | | | 711/112 |
| 8,886,910 | B2 * | 11/2014 | Mehra | G06F 3/0605 |
| | | | | 711/112 |
| 8,954,663 | B1 * | 2/2015 | Klein | G06F 3/0619 |
| | | | | 711/111 |
| 9,141,542 | B1 * | 9/2015 | Justiss | G06F 17/30067 |
| 2001/0011323 | A1 * | 8/2001 | Ohta | G06F 3/061 |
| | | | | 711/112 |
| 2002/0073285 | A1 * | 6/2002 | Butterworth | G06F 3/0608 |
| | | | | 711/154 |
| 2002/0087539 | A1 * | 7/2002 | Muraoka | G06F 17/30595 |
| 2005/0015372 | A1 * | 1/2005 | Van Eijndhoven | G06F 9/30087 |
| 2006/0080502 | A1 * | 4/2006 | Sakaki | G06F 3/0607 |
| | | | | 711/112 |
| 2006/0080733 | A1 * | 4/2006 | Khosmood | H04L 63/0263 |
| | | | | 726/13 |
| 2007/0162691 | A1 * | 7/2007 | Bhakta | G06F 3/0613 |
| | | | | 711/112 |
| 2009/0310242 | A1 * | 12/2009 | McLeod | G06F 3/0623 |
| | | | | 360/55 |
| 2010/0118722 | A1 * | 5/2010 | Lu | H04J 3/24 |
| | | | | 370/252 |
| 2010/0191922 | A1 * | 7/2010 | Dickey | G06F 3/061 |
| | | | | 711/154 |
| 2010/0316353 | A1 * | 12/2010 | Asano | G11B 27/005 |
| | | | | 386/241 |
| 2011/0153771 | A1 * | 6/2011 | Lin | G06F 13/00 |
| | | | | 709/212 |
| 2011/0270855 | A1 * | 11/2011 | Antonysamy | G06F 17/30179 |
| | | | | 707/756 |
| 2011/0276756 | A1 * | 11/2011 | Bish | G06F 3/0611 |
| | | | | 711/112 |
| 2011/0283077 | A1 * | 11/2011 | Cammarata | G06F 3/0619 |
| | | | | 711/170 |
| 2012/0131271 | A1 * | 5/2012 | Araki | G06F 3/061 |
| | | | | 711/112 |
| 2012/0210066 | A1 * | 8/2012 | Joshi | G06F 12/0866 |
| | | | | 711/118 |
| 2013/0124932 | A1 * | 5/2013 | Schuh | G11C 29/08 |
| | | | | 714/718 |
| 2013/0227215 | A1 * | 8/2013 | Lee | G06F 3/061 |
| | | | | 711/113 |
| 2013/0232300 | A1 * | 9/2013 | de la Iglesia | G06F 3/0604 |
| | | | | 711/114 |
| 2013/0297855 | A1 * | 11/2013 | Gupta | G06F 3/0656 |
| | | | | 711/103 |
| 2015/0121002 | A1 * | 4/2015 | Tsuchiyama | G06F 11/1096 |
| | | | | 711/114 |
| 2015/0277801 | A1 * | 10/2015 | Konishi | G06F 3/0625 |
| | | | | 711/114 |

OTHER PUBLICATIONS

Zhu, Benjamin; Li, Kai; Patterson, Hugo; "Avoiding the Disk Bottleneck in the Data Domain Deduplication File System," Fast '08: 6th USENIX Conference on File and Storage Technologies, 2008, pp. 269-282 (14 pages).

Hitachi Data Systems Corporation "Hitachi Data Systems High-Throughput Storage Solution With Lustre" Sp-126-B DG; May 2013 (4 pages).

Website: www.ni.com; "High-Speed Data Streaming: Programming and Benchmarks," Publish Date: Nov. 21, 2013; pp. 1-7 (7 pages).

Website: awsdocumentation; "What is Amazon S3?" Amazon Simple Storage Service, Developer Guide (API Version) Mar. 1, 2006; (1 page).

* cited by examiner

HIGH-SPEED DATA STORAGE

FIELD OF THE INVENTION

The present invention relates to the field of data storage, and more particularly to systems and methods for high-speed data storage.

DESCRIPTION OF THE RELATED ART

Given the rapid increases in information generation, processing, and storage required in the modern world, prior art data storage techniques are increasingly unable to store extremely large quantities of continuous (or streamed) data rapidly without losing (dropping) some of the data. More generally, prior art computing devices store data on data storage mediums using some type of file system. A file system is an organization of data on a device such as a disk using indexes, tables, pointers, nodes and other meta-data entities to facilitate the rapid lookup and retrieval of the data from the disk. Also, file systems allow more than one data entity to be stored on a disk. For example, the startup/boot software, the operating system, user applications, user data and many other types of data all share the space made available by the file system on a device. The Windows brand of operating systems, manufactured by Microsoft, typically utilize the FAT and NTFS file systems. The Apple OS X operating system typically uses the HFS Plus file system, and Linux typically uses one of the EXT file system variants. The S3 (Simple Storage System) approach used by Amazon.com, Inc., utilizes what might be referred to as a meta-file system architecture in that files (and even file systems) may be stored as objects in the system, where metadata is stored for each of the objects. Note that the data in S3 are not homogenous and are referenced using a key or index of some sort because the data are not stored or accessed in a linear manner. Thus, all prior art computing devices from cell phones to desktop computers utilize file systems to organize and store data.

There is an overhead associated with using a file system. In order to organize the data on a file system, the various data (or meta-data) kept regarding the data must be updated whenever data changes in the file system. For example, whenever someone opens a file using a word processor application, the word processor requests the operating system to open the file and to provide a pointer to the beginning of the file's data. This one operation may involve the operating system looking up the beginning of the file system on disk, finding the first element of the file's path on the file system, finding a pointer to the next element of the path of the file, repeating that operation until the area on disk where the actual file resides is found, writing something within the file system to indicate the file is open, and then passing the pointer to the data to the application. During this process many read operations and possibly a few write operations occur to the disk. A write operation (for example: saving a word processing file to disk) involves more operations that a read when using a file system.

Under normal conditions, these reads and writes to the disk are unnoticed because file systems, operating systems and various caching methods are designed to mitigate the amount of time needed to perform these operations. Writing a file to a disk takes even longer, because there are more writes to a disk interspersed with the reads. Much research is conducted in order to optimize or 'tweak' file systems to be more efficient, and to make as much of this process quick and transparent to the end user.

However, some streams of data may need to be stored at much higher rates of speed which may overwhelm the operating system's ability to manage the file system. In such cases, data are usually lost. Thus, both data storage and retrieval involve processing of metadata to store and retrieve the data, which adds overhead, and thus limits performance of the system.

Accordingly, improvements in high speed data storage methods are desired.

SUMMARY OF THE INVENTION

Various embodiments of a system and method for high speed data storage are presented.

The system may include a computer, including a processor and a memory, coupled to the processor, where the memory stores program instructions, and a direct access storage device (DASD), coupled to the computer, where the DASD is initially unmounted and unformatted. The program instructions may be executable by the processor to implement the novel methods of high speed data storage disclosed herein.

In one embodiment, the unmounted unformatted DASD may be opened via an operation system (OS) application programming interface (API), and a maximum amount of storage space afforded by the DASD determined. The DASD may be locked, thereby limiting write access to the DASD to a first application process and excluding writes to the DASD by any other application process. A stream of data may be received, where the data are of a single data type, and where receiving the stream of data is invoked by the first application process. The stream of data may be stored on the DASD in a linear manner as it is received, where the storing does not use a file system architecture, metadata, indices, or keys associated with the data. Storing the stream of data on the DASD may include writing a block of the stream of data to the DASD and returning a next contiguous write location on the DASD. This writing and returning may be performed multiple times in an iterative manner. The stored data may be readable by multiple readers in a linear manner without using the file system architecture, metadata, indices, or keys.

Performing the writing and returning multiple times in an iterative manner may include wrapping back to the beginning of the DASD in response to the DASD being full. For example, the wrapping may include indicating, by the next contiguous write location, the beginning of the DASD in response to the DASD being full, and writing an immediately subsequent block of the stream of data at the beginning of the DASD. Alternatively, in some embodiments, the method may include halting the iterative writing and returning in response to the DASD being full.

In some embodiments, the method may further include placing a marker at the beginning of the DASD, thereby identifying the DASD and establishing an exclusive relationship between the first application process and the DASD.

The stream of data may be of any (single) data type and format desired. For example, in one embodiment, the stream of data is or includes network packets. In another exemplary embodiment, the stream of data may be or include geological data.

Storing the stream of data may further include converting the received stream of data into blocks of data, and storing each block of data with a respective sequential write to the DASD. Accordingly, determining the maximum amount of storage space afforded by the DASD may include determining a maximum number of blocks of data afforded by the DASD, where each next contiguous write location is a raw block address on the DASD.

In some embodiments, storing the stream of data on the DASD in a linear manner may be performed by a software driver configured to optimize speed and throughput of the DASD for storing sequential data, e.g., a stream disk driver executing on the computer system. To optimize speed and throughput of the DASD for storing sequential data, the software driver may store the blocks of data on the DASD at contiguous locations on the DASD, thereby minimizing mechanical movement of the DASD.

The DASD may be configured for access by one or more linear read processes, where each linear read process is restricted to reading data from the DASD starting at the beginning of the DASD and reading the data in a linear manner.

BRIEF DESCRIPTION OF THE DRAWINGS

A better understanding of the present invention can be obtained when the following detailed description of the preferred embodiment is considered in conjunction with the following drawings, in which.

Figure 1:
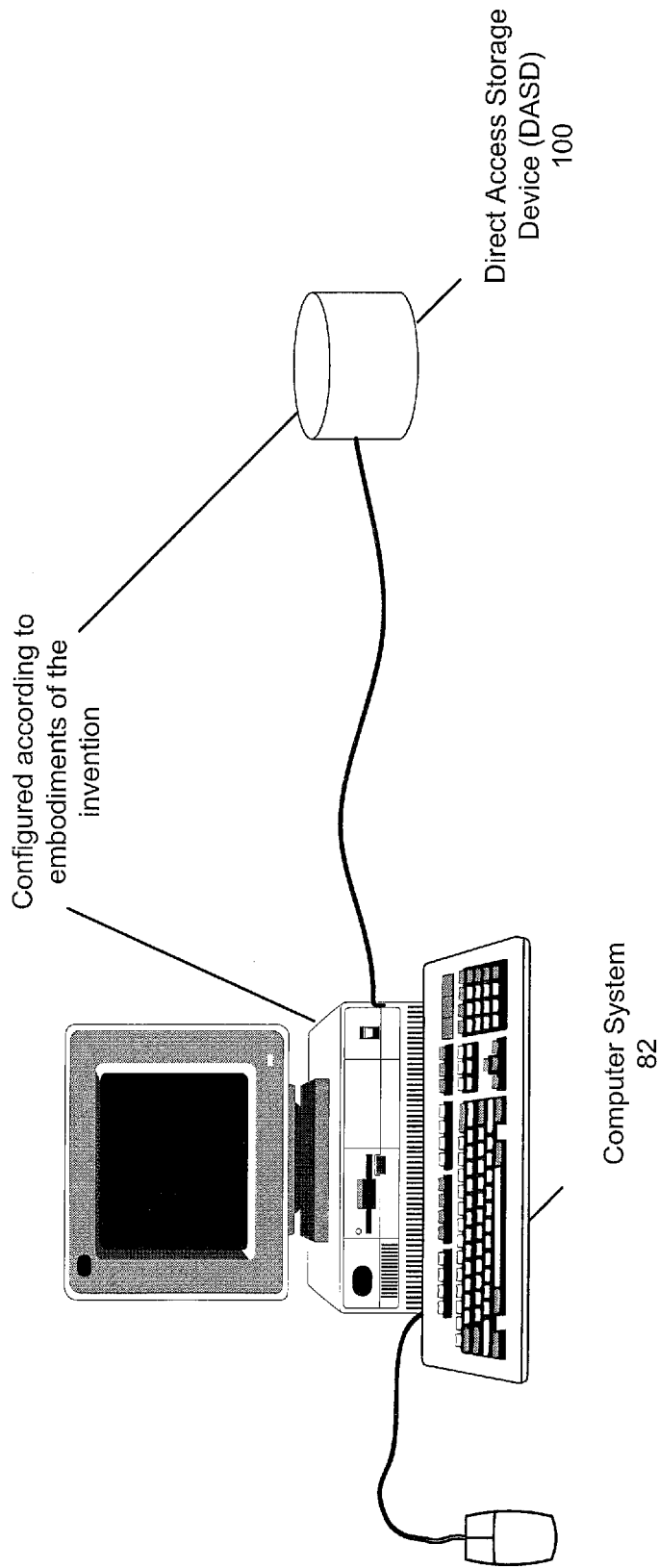
FIG. 1 illustrates a high speed data storage system, according to an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a physical communication medium such as a bus, network and/or other physical transmission medium.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium and/or a programmable hardware element; encompasses various types of mediums that can either store program instructions/data structures or can be configured with a hardware configuration program. For example, a medium that is "configured to perform a function or implement a software object" may be 1) a memory medium or carrier medium that stores program instructions, such that the program instructions are executable by a processor to perform the function or implement the software object; 2) a medium carrying signals that are involved with performing the function or implementing the software object; and/or 3) a programmable hardware element configured with a hardware configuration program to perform the function or implement the software object.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise the GUI Elements embedded in the block diagram portion of the graphical program.

Graphical User Interface Element—an element of a graphical user interface, such as for providing input or displaying output. Exemplary graphical user interface elements comprise input controls and output indicators Input Control—a graphical user interface element for providing user input to a program. An input control displays the value input the by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Input/Output Attribute—Some attribute or characteristic of the data type of an input or output parameter. For example, the number of bits required to store data of a given type.

Data Type—Describes how information (bits) in storage (memory) should be interpreted. For example, the data type 'double' commonly means a 64-bit floating-point number in IEEE 754 format. Similarly, the data type "packet" may refer to data in the form of packets. Of course, any of various names and formats may be used as desired, including user-defined data types.

Representation—With regards to numbers, how numbers are represented in storage. For example the text '−12' is decimal representation of the number negative twelve. In a 5 bit two's complement binary representation, '−12' is expressed as '10100'.

Direct Access Storage Device (DASD)—a device with moving mechanical components (platters, read/write heads, and thus, solid state devices (SSDs) are not included in this definition) intended to store blocks of data (such as on a magnetic disk) such that the blocks of data can be randomly accessed for read and write operations. This is in contrast to a LASD (Linear Access Storage Device) such as a tape drive, where the underlying mechanism was not designed or is not physically suited to randomly accessing data. Moreover, as used herein, the term DASD refers to non-volatile memory, and so precludes RAM (random access memory), which is volatile, i.e., once power is turned off, volatile memory loses the data stored thereon, whereas a DASD, being non-volatile, retains the data when powered down.

FIG. 1—Exemplary High Speed Data Storage System

FIG. 1 illustrates an exemplary high speed data storage system configured to implement embodiments of the present techniques. As shown, in the embodiment shown, the system may include a computer system 82, coupled to a Direct Access Storage Device (DASD) 100, e.g., via a cable, or over a network, where the computer system 82 and the DASD 100 are configured to implement embodiments of the novel techniques disclosed herein. Embodiments of the high speed data storage system may effectively address (or solve) the problem of storing extremely large quantities of continuous data rapidly so that no data are lost as a result of CPU/Bus/Disk IO congestion (on a computer). Embodiments of the system may be implemented using a combination of a DASD (Direct Access Storage Device) and an object code (binary) library (e.g., including an application programming interface (API) for invoking or including functions of the library), which may be referred to herein for convenience as the StreamDisk™ library, although any other name may be used as desired. This object code library may implement or be used to implement a stream disk driver (program) which may perform embodiments of the methods disclosed herein, as will be discussed in more detail below. In other words, this library may include the necessary software components to implement a software driver, and may thus provide the primary software component(s) of the embodiments disclosed herein. In some embodiments, the computer 82 may also store and execute an application which may access the DASD via the stream disk driver.

As shown in FIG. 1, in some embodiments, the computer system 82 may include a display device, which may be operable to display a graphical use user interface (GUI), whereby a user may control, monitor, or configure the system. The graphical user interface may comprise any type of graphical user interface as desired, e.g., depending on the computing platform.

Exemplary Applications

Embodiments of the present invention may be used for a plethora of applications and are not limited to any particular domain of use or application. In other words, applications discussed in the present description are exemplary only, and the present invention may be used in any of various types of systems.

Exemplary use cases for the present techniques include, but are not limited to:

1) Network traffic data capture: Since network data arrive at a capture device (usually a network interface of an electronic tap) in a linear manner at high rates of speed, the data may be stored to a DASD device using the present techniques to prevent loss of data.

2) Geologic data capture: Geological data, e.g., from underground seismic scanning, e.g., for petroleum or natural gas exploration or extraction, mining, etc., is typically voluminous and arrives in great quantities at a recording device in a short time frame. The present techniques may be used to store this data rapidly for later retrieval at a more leisurely rate.

3) Astronomical data capture: data from many distant data sources, e.g., satellites, telescopes, even computer models, may arrive at a central storage facility. These data are usually time sensitive in terms of when they were collected, and how quickly they must be stored.

4) Genomic data capture: Genetic information may be produced at high rates, e.g., by automated gene sequencing, but may require lossless transfer and storage, and so the present techniques may be used to ensure that the data are stored quickly and in a lossless manner.

Of course, these are but a few exemplary applications, and it should be noted that the present techniques may be used to perform high speed data storage for any type of application desired. Thus, embodiments of the system and method of the present invention are operable to be used in any of various types of applications, including, but not limited to, applications in network monitoring, geology, geophysics, multimedia, video, audio, telephony, medicine, science, e.g., astronomy, astrophysics, genomics, etc., environmental monitoring, finance (including stocks, bonds, futures, etc.), security, surveillance, and games, among others.

Figure 2:
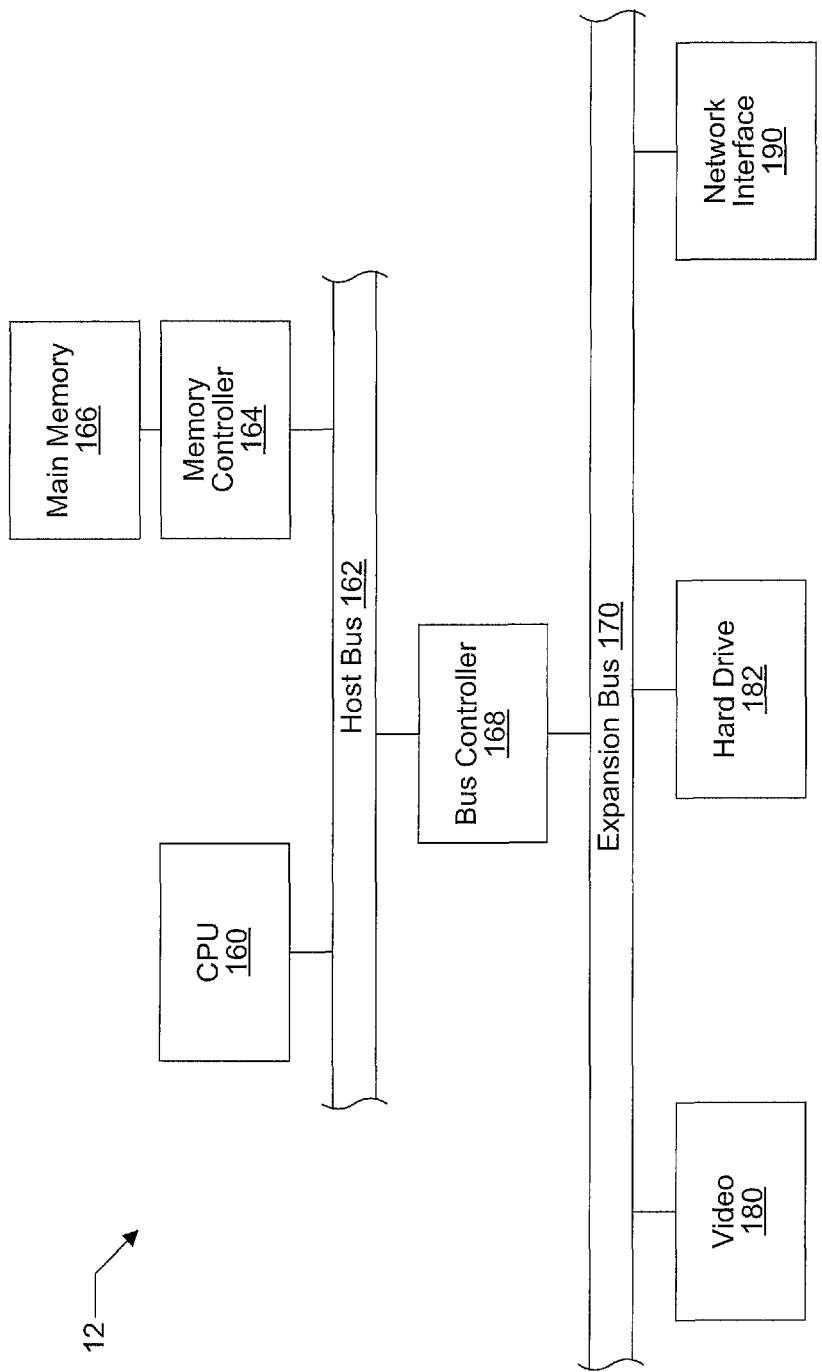
FIG. 2 is a high level block diagram of an exemplary computer system, according to one embodiment.

FIG. 2—Computer System Block Diagram

FIG. 2 is a block diagram 12 representing one embodiment of the computer system 82 illustrated in FIG. 1. It is noted that any type of computer system configuration or architecture can be used as desired, and FIG. 2 illustrates a representative PC embodiment. It is also noted that the computer system may be a general purpose computer system, a computer implemented on a card installed in a chassis, an embedded device, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an those produced by Intel Corporation, Advanced Micro Devices (AMD), and ARM, among others. A memory medium, typically comprising RAM and referred to as main memory, 166 is coupled to the host bus 162 by means of memory controller 164. The main memory 166 may store programs implementing embodiments of the techniques disclosed herein. For example, the memory medium may store one or more programs which are executable to perform the methods described herein, such as a stream disk driver, as will be described below. The memory medium may also store operating system (OS) software, as well as other software for operation of the computer system, although operation of the OS may be restricted, as also described below. Various embodiments further include receiving or storing instructions and/or data implemented in accordance with the foregoing description upon a carrier medium.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170, as well as a network interface 190. However, it should be noted that the computer 82 may include any other interfaces, components, or modules as desired.

Figure 3:
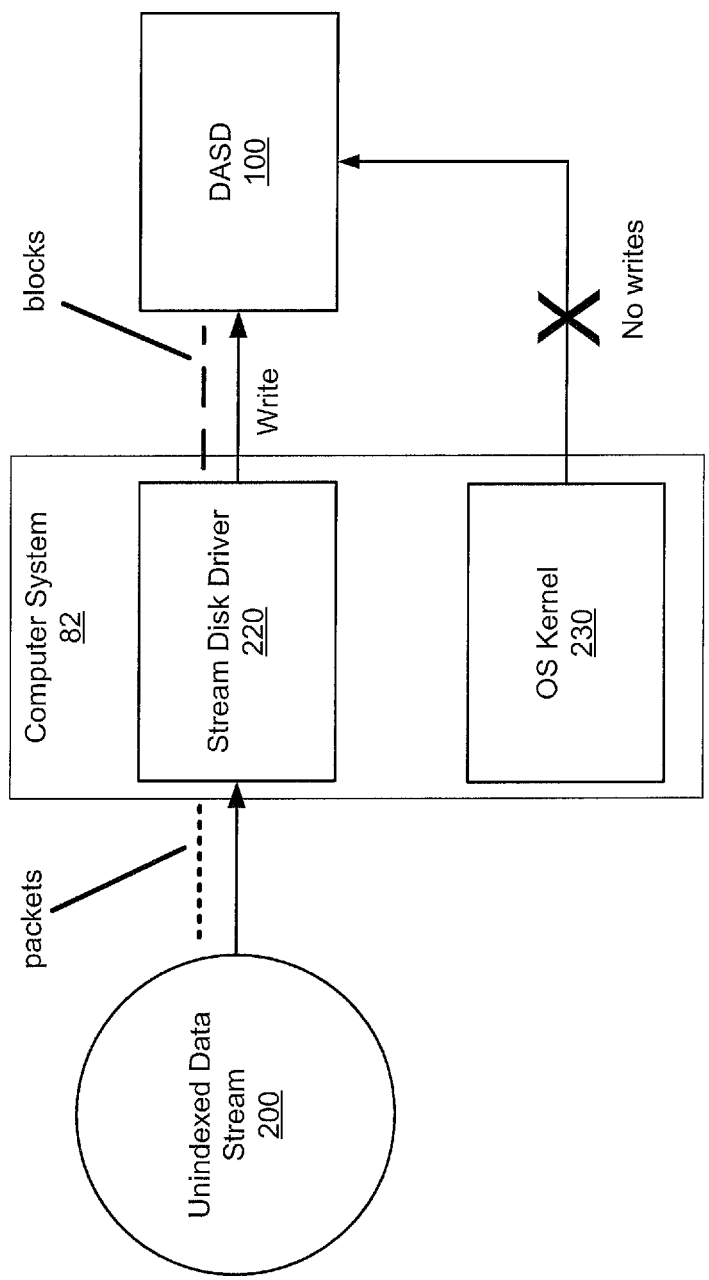
FIG. 3 is an exemplary flow diagram for high speed data storage, according to one embodiment.

FIG. 3—Exemplary Flow Diagram

FIG. 3 is an exemplary high level flow diagram for high speed data storage, according to one embodiment. More specifically, FIG. 3 illustrates streaming of data to the DASD 100 through exemplary components or agents, according to one embodiment.

As FIG. 3 shows, a data stream 200 is received (or acquired) by a computer, e.g., computer system 82. In some embodiments, the data stream 200 is an unindexed data stream, as indicated in FIG. 3. Note that as used herein, the term "unindexed data stream" means that no indices in the data stream are available, understandable, or otherwise useable by the present systems and methods. Thus, the data stream presented to the system may or may not have indexing information embedded within it, but any indices that are in the data are not interpreted or understood by the present system (i.e., embodiments of the present hardware/software combination disclosed herein). The present system is only aware of the raw block address on the device to which it is writing next, and is specifically not aware of any metadata, indexing, or pointers within the data. However, in cases where indices are embedded in the stream of data, a consumer of the data (whatever entity is using the system) would presumably understand any internal indexing of the data stream. In one exemplary embodiment, the unindexed data stream 200 may comprise packets, e.g., network or telecommunication packets, although any other data format may be used as desired.

The data stream may be received from any of a variety of devices, including, for example, another computer system, e.g., similar to the computer systems of FIG. 1 or FIG. 2, a network hub, an embedded device, a measurement device, a sensor, and so forth, as desired.

As also shown, the computer system 82 includes a software driver, referred to herein as "stream disk driver" 220, and an OS kernel 230 (possibly among other software). Note that the term "stream disk driver" is used for convenience and clarity, but this name or denotation is exemplary only, and any other name may be used as desired. In other words, the software is defined by its functionality, not its name.

The stream disk driver 220 may receive the data stream in the form of a stream of packets and convert the stream of packets into blocks, e.g., of a specified size, and write the blocks to the DASD 100 in a linear manner. This conversion process is represented in FIG. 3 as a dotted line labeled "packets" entering the stream disk driver 220, and a dashed line labeled "blocks", exiting the stream disk driver 220.

As FIG. 3 also indicates, during this process (of receiving, converting, and writing the data stream) the OS kernel 230 may be prevented from writing to the DASD 100, as represented by the large "X" labeled "no writes", as discussed in more detail below.

Thus, a basic premise of the present techniques is to remove the operating system and file system overhead from the equation of how data are written to disk, thus radically expanding bandwidth and throughput.

Figure 4:
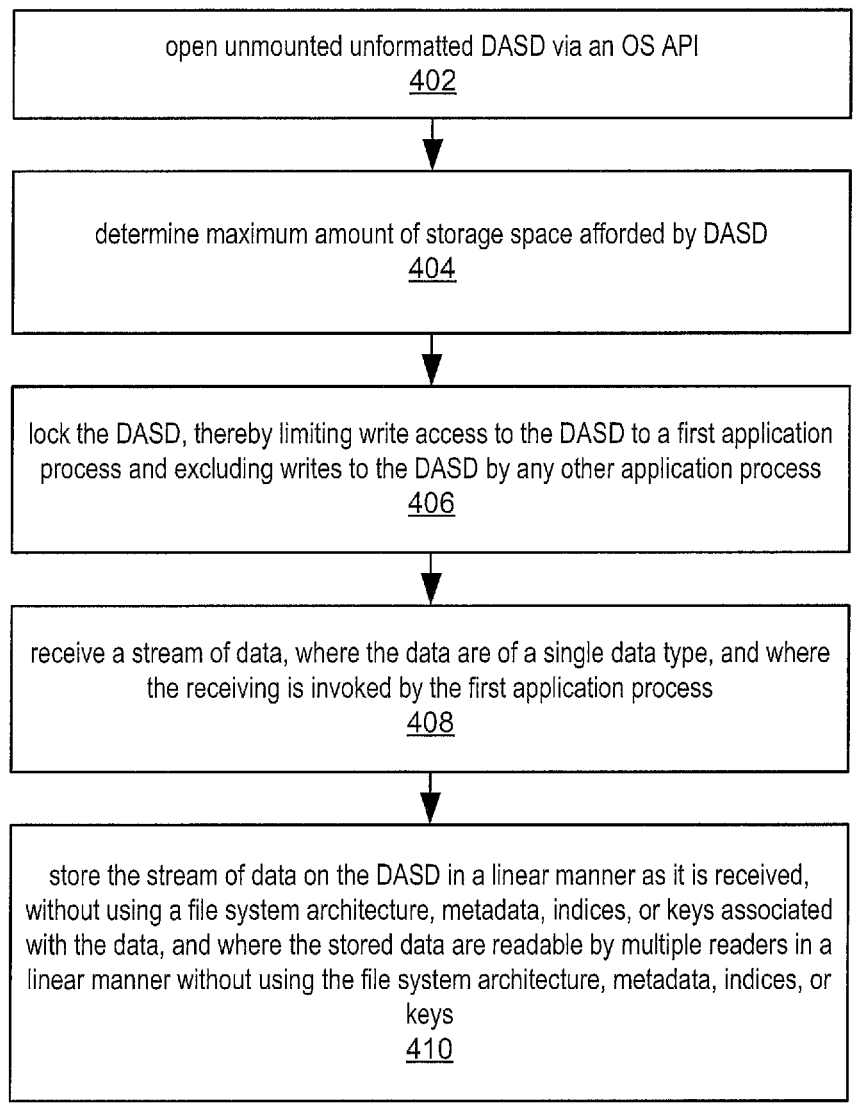
FIG. 4 is a flowchart diagram illustrating one embodiment of a method for high speed data storage.

FIG. 4—Method for High Speed Data Storage

FIG. 4 illustrates a method for high speed data storage, according to one embodiment. The method shown in FIG. 4 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

Figure 6A:
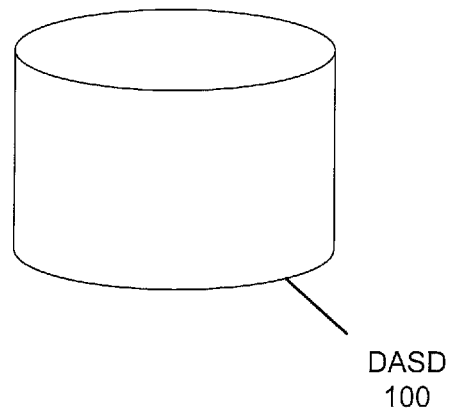
FIGS. 6A-6E illustrate exemplary operation of a high speed data storage system, according to one embodiment.

In 402, an unmounted unformatted direct access storage device (DASD), e.g., DASD 100 of FIG. 3, may be opened via an operating system (OS) application programming interface (API). This step is usually performed by operating systems to build or check a file system; however, the method does this to begin to directly record application data (a stream of data) to the device. In other words, the DASD may be opened as a "raw" storage device, i.e., that has not been formatted or mounted, and thus does not support a file system. FIG. 6A illustrates an exemplary unmounted unformatted DASD 100, according to one embodiment. Opening the unmounted and unformatted DASD as a raw device while bypassing all file system protocols may reserve the whole DASD for the specific use of the novel stream storage process described herein.

Figure 6B:
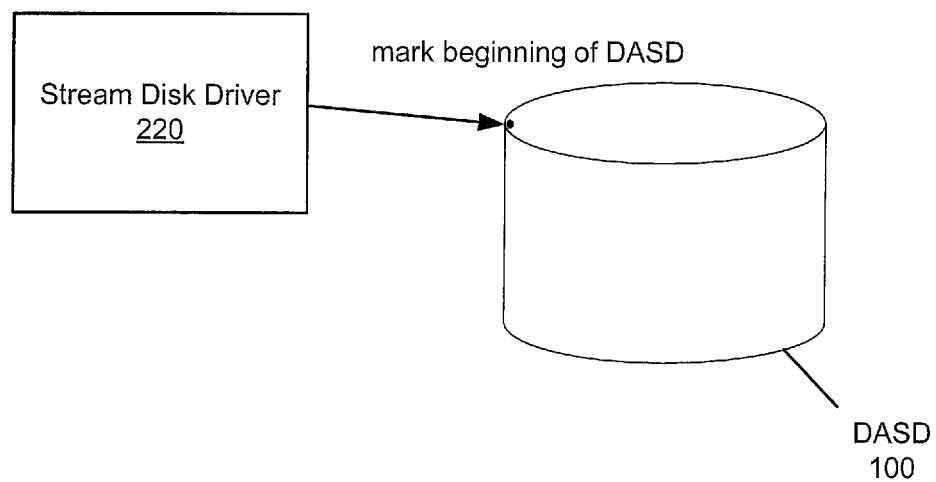
Figure 6C:
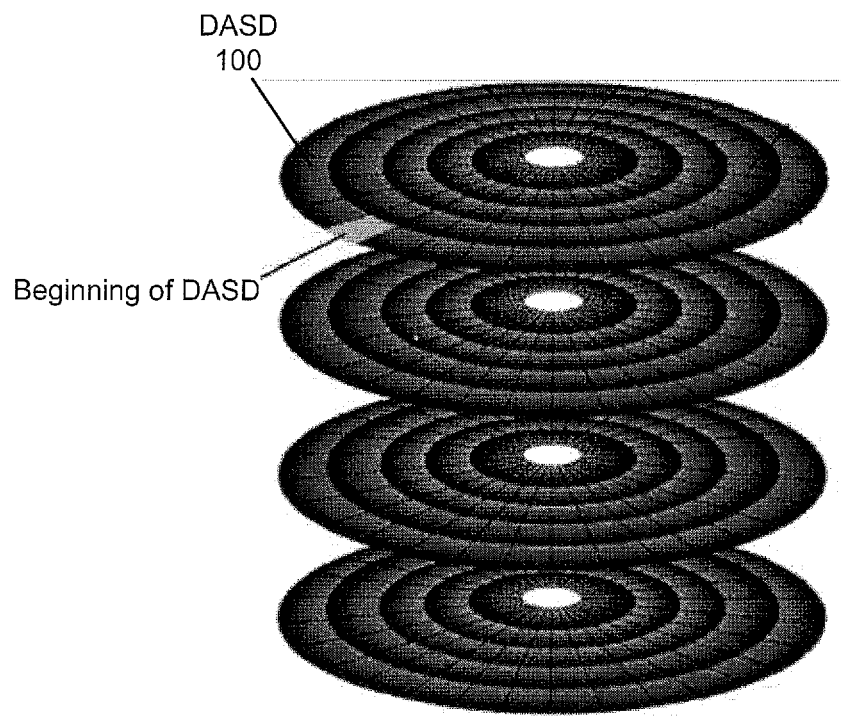

In 404, a maximum amount of storage space afforded by the DASD may be determined or calculated, e.g., by querying the DASD, by consulting vendor or configuration information for the DASD, etc. Said another way, the maximum available storage space of the DASD may be determined, as illustrated in FIG. 6C. In one embodiment, this determination may include reading though the DASD to determine how many block are available. Alternatively, an existing OS API may be used to determine this number. In some embodiments, the stream disk driver (e.g., using the StreamDisk library) may utilize this information to determine when the data writes should be wrapped, as discussed in more detail below. Again, the system is only aware of the raw block address on the device to which it is writing next, and is not aware of any more meta-data, indexing or pointers within the data.

In 406, the DASD may be locked, thereby limiting write access to the DASD to a first application process (e.g., via a stream disk driver program) and excluding writes to the DASD by any other application process (or more generally, any other process at all, including the OS). Thus, the DASD may be configured for access only by the first application process (e.g., via the stream disk driver program).

In 408, a stream of data, also referred to as a "data stream", may be received, where the data are of a single data type. The data may be received in response to an invocation by, or a command or message from, the first application process. Said another way, the first application process may invoke reception of the stream of data. More generally, the first application process may determine when the high speed data storage process starts and/or stops, and may invoke initiation and/or termination of the process by the stream disk driver.

As noted above, the stream of data may be an unindexed data stream 200, as defined above, according to which the data stream presented to the system may or may not have indexing information embedded within it, but any indices in the data are not interpreted or understood by the present system (i.e., embodiments of the present hardware/software combination disclosed herein). The present system is data agnostic (so long as it has a single data type), and is not concerned with indexing within the data, although, as explained above, a consumer of the data (whatever is using the system) would presumably understand any internal indexing of the data stream. The system is only aware of the raw block address on the device to which it is writing next, and is specifically not aware of any metadata, indexing, or pointers within the data.

As with the technique described above with reference to FIG. 3, the data stream may comprise packets, e.g., network or other telecommunication packets, although any other data format may be used as desired. The stream of data may be received from any of a variety of devices, which may be referred to herein as data capture devices, and which may include, for example, another computer system, e.g., similar to the computer systems of FIG. 1 or FIG. 2, a network hub, an embedded device, a measurement device, a sensor or instrument, and so forth, as desired.

In 410, the stream of data may be stored on the DASD in a linear manner as it is received, e.g., by the stream disk driver. The storing may not use a file system architecture, metadata, indices, or keys associated with the data. In other words, the stream disk driver 220 may write the stream of data to the DASD directly (and linearly) without using any kind of file system architecture, metadata, indices, or keys. Once the data are written to the DASD, the stored data (of the stream of data) may be readable by multiple readers in a linear manner without using the file system architecture, metadata, indices, or keys. Note that the terms "linear manner" and "linearly" mean that the data are written to the DASD or read from the DASD starting from the beginning of the DASD storage and proceeding one contiguous block of data at a time. Thus, unlike traditional arrangements, the reads and writes are not permitted to access the DASD at any arbitrary (or specified) location or address.

The single linear write process provides for extremely fast streaming (or writing) of data to the DASD as compared to traditional approaches. Moreover, supporting plural linear read processes facilitates rapid retrieval of stored data without compromising the speed and efficiency of the write process. Further details regarding the single write process are presented with reference to FIG. 5, now described.

Figure 5:
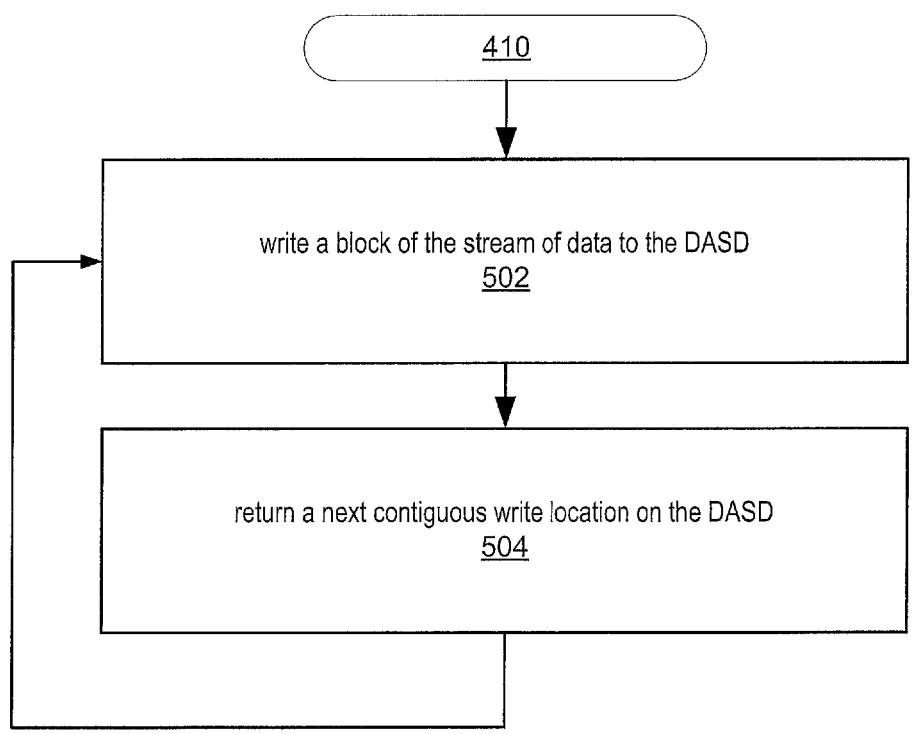
FIG. 5 is a flowchart diagram illustrating an exemplary write process for high speed data storage, according to one embodiment.

FIG. 5—Exemplary Write Process for High Speed Data Storage

Turning now to FIG. 5, a flowchart diagram is presented illustrating an exemplary write process for high speed data storage, according to one embodiment. More specifically, FIG. 5 flowcharts an exemplary method for performing the storing of method element 410 of the method of FIG. 4. In some embodiments, the first application process may use the stream disk driver 220 (e.g., using the StreamDisk™ library or functional equivalent) to perform the method of FIG. 5.

As shown, in 502, a block of the stream of data may be written to the DASD, e.g., by the stream disk driver 220.

Then, in 504, a next contiguous write location on the DASD may be returned, e.g., by the stream disk driver 220. In other words, when the stream disk driver 220 writes a block of data to the DASD 100, it may return the immediately subsequent write location for use by the next write. In one embodiment, the stream disk driver 220 may return the subsequent write location to the first application process, which may store (or remember) the location and pass it back to the stream disk driver 220 for the next write operation.

Note that in some embodiments, no information about the current write position on the DASD 100 is stored on the DASD 100, which may prevent additional writes and head movements on the DASD. All meta-data for the stream of data may be maintained by the first application process.

As further indicated in FIG. 5, the writing (502) and returning (504) may be performed multiple times in an iterative manner, i.e., after returning the next contiguous write location, the method may proceed (again) to method element 502 to write the next block of data from the stream of data, and continue as described above, e.g., until an ending condition is met, e.g., when the stream of data terminates, or in response to a command or message from the first application process.

Another consideration of the present techniques is whether or not the writing operations halt or wrap once the end of the DASD is reached. The stream disk driver may wrap data to the beginning of the device if the application continues to write data. Thus, in some embodiments, performing the writing and returning multiple times in an iterative manner may include wrapping back to the beginning of the DASD in response to the DASD being full. This wrapping (back) may include indicating, by the next contiguous write location, the beginning of the DASD in response to the DASD being full, and writing an immediately subsequent block of the stream of data at the beginning of the DASD. Accordingly, the stream disk driver may report a next block location that is lower than the last next block location when finishing a write operation, thereby indicating that data were wrapped to the beginning of the DASD. In other words, the write to the last available location on the DASD may return the first write location of the DASD. Note that any data already stored at this first write location may thus be overwritten. Alternatively, in one embodiment, the method may halt the (iterative performing of) the writing and returning in response to the DASD being full.

As noted above regarding the method of FIG. 4, the stored data may be readable by multiple readers in a linear manner without using the file system architecture, metadata, indices, or keys. Note that while other applications may request or use the stream disk driver to read data from the DASD, there may only ever be one writer. Typically this approach increases disk throughput by one or two orders of magnitude over approaches using a standard file system. Typical file system operations are generally not capable of keeping up with the speed and quantity of data that traverse a network or are produced at high rates.

Further Embodiments

The following describes various further embodiments of the above techniques, although it should be noted that the particular embodiments described are meant to be exemplary only, and are not intended to limit embodiments of the present invention to any particular form, function, or appearance.

In one embodiment, the method may further include placing, e.g., via a write operation by the stream disk driver 220, and possibly in response to a command or message from the first application process, a marker at the beginning of the DASD, thereby identifying the DASD and establishing an exclusive relationship between the first application process and the DASD. FIG. 6B illustrates such placement of a marker on the DASD by the stream disk driver, according to one embodiment. Marking the beginning of the DASD may indicate exclusive access by one process or thread, and may include creating a beginning point of the DASD, which provides a reference point for the beginning of the data blocks.

As noted above, the stream of data may include any kind of data (content) desired, and may be formatted or organized in any of a number of ways. For example, the stream of data may include network packets. In another embodiment, the stream of data may be or include geological data. In other embodiments, other types of data may be streamed, e.g., astronomical data, genomic data, financial data, etc., as desired.

As discussed above, in some embodiments, storing the stream of data on the DASD in a linear manner may be performed by a software driver (i.e., the stream disk driver) configured to optimize speed and throughput of the DASD for storing sequential data. The stream disk driver may use or be implemented by the object code library mentioned earlier, and may be invoked or controlled, at least to some extent, by the first application process. For example, the first application process may initiate and/or terminate the high speed data storage process.

In one embodiment, to optimize speed and throughput of the DASD for storing sequential data, the software driver may store the blocks of data on the DASD at contiguous locations on the DASD (e.g., beginning at the marked location), thereby minimizing mechanical movement of the DASD. Moreover, as discussed above, the DASD may be configured for access by one or more linear read processes, where each linear read process is restricted to reading data from the DASD starting at the beginning of the DASD and reading the data in a linear manner.

Figure 6D:
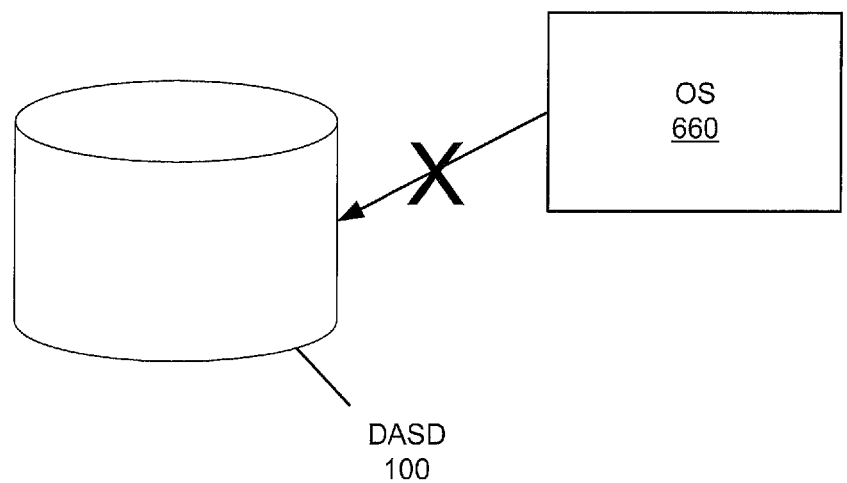

As noted above, during operation, the OS may be prevented from modifying the DASD, as illustrated in FIG. 6D. In other words, the method may include locking the device to prevent OS intervention. The present system may communicate to other systems that this DASD is not available. This "off limits" operation tells all other operating systems (OS) and file system components to ignore the DASD so that it is not disturbed with other functions or operational tasks, thus eliminating interruptions. This allows the disk to solely be reserved for the present stream storage techniques.

Figure 6E:
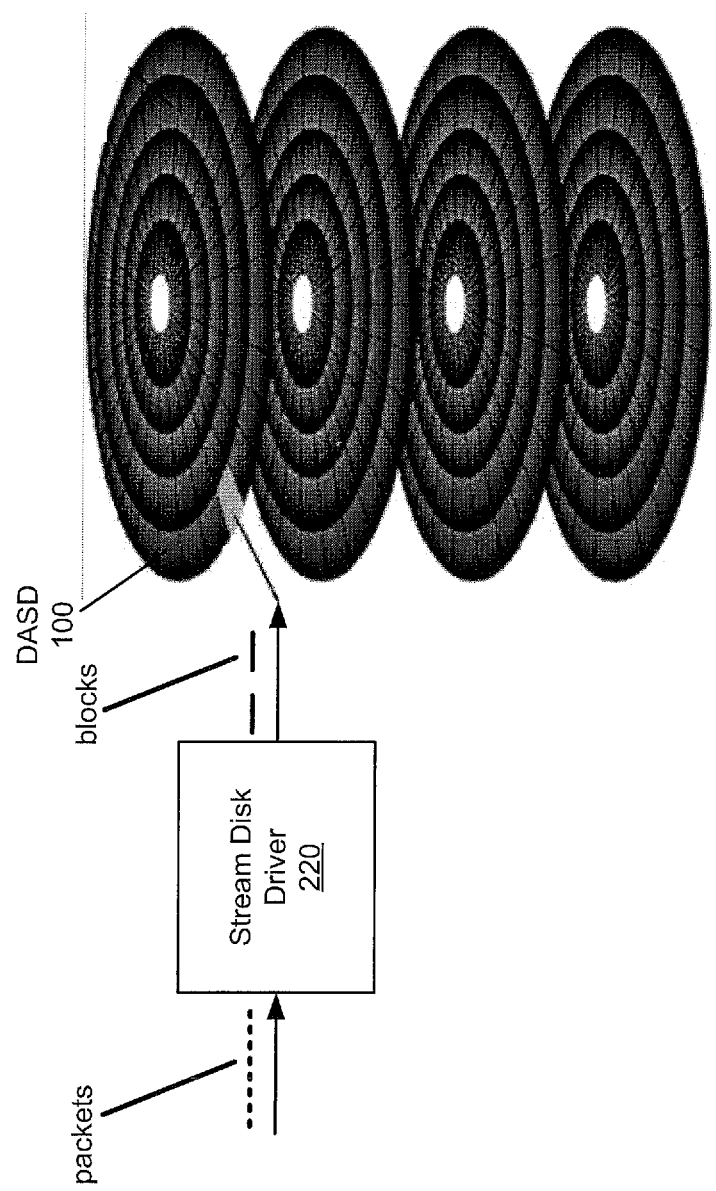

In some embodiments, storing the stream of data may include converting the received stream of data into blocks of data, and storing each block of data with a respective sequential write to the DASD. Accordingly, determining the maximum amount of storage space afforded by the DASD may include determining a maximum number of blocks of data afforded by the DASD. Similarly, each next contiguous write location may be a raw block address on the DASD. Exemplary conversion of the data stream to blocks of data is illustrated in FIG. 6E, where the data stream is received by the stream disk driver 220 as packets, and converted to blocks for storage on the DASD 100, e.g., via an API of the object code library.

Figure 7:
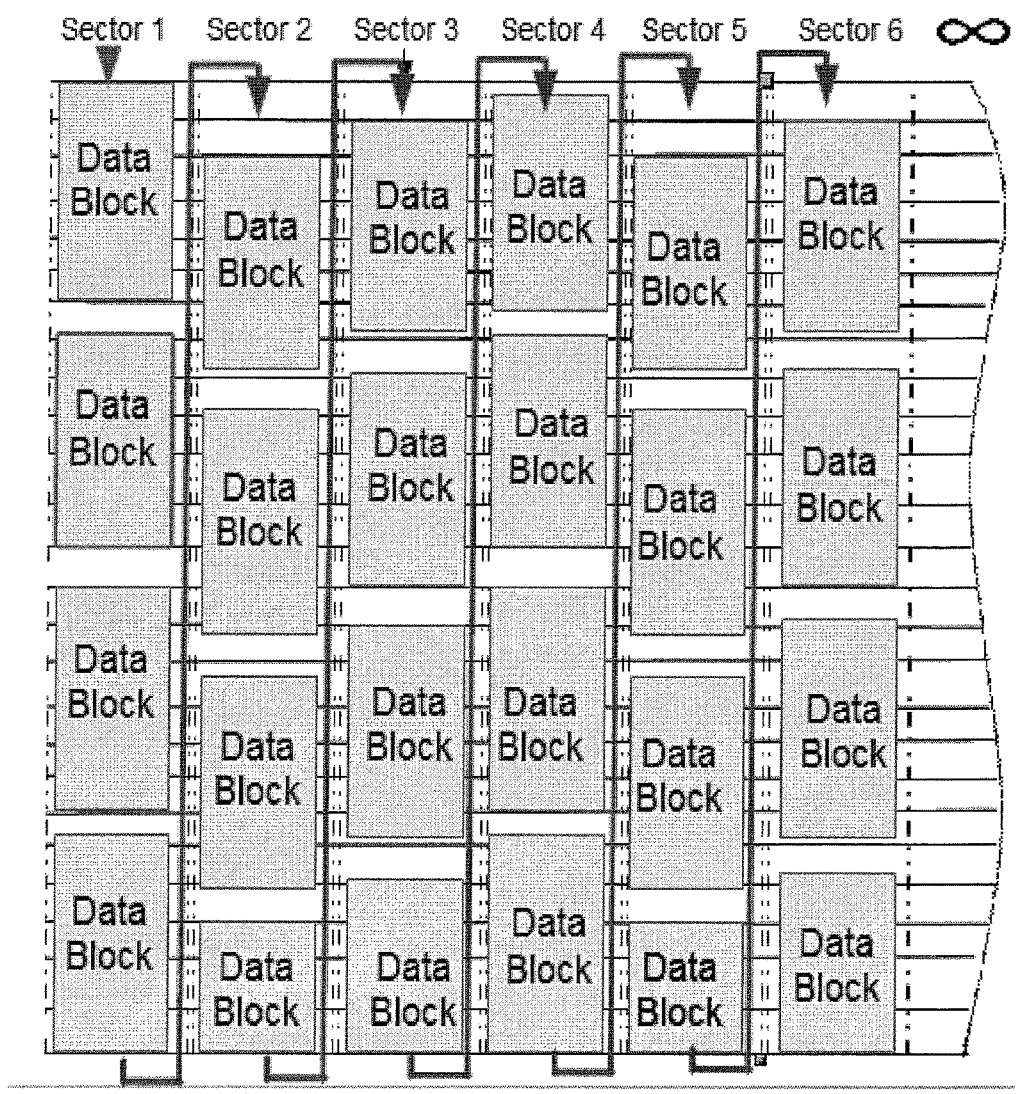
FIG. 7 illustrates linear block data stored on a high speed data storage system, according to one embodiment.

Blocks may be stored in an order that minimizes mechanical movement of the DASD, i.e., movement of the write head(s). The diagram FIG. 7 illustrates one embodiment of block data storage on a DASD, where, as may be seen, successive data blocks are stored in contiguous fashion across multiple sectors of the DASD, thus minimizing mechanical movement of the (write head(s)) of the device. Note that FIG. 7 shows only sectors 1 through 6 of the DASD's disk surface, but indicates that the storage continues through all of the sectors on the disk by the "infinity" symbol. As shown, data blocks, previously converted from the stream data to blocks, are written in sequential (linear) order, and so the disk head does not move from one sector to another until the sector is full. This linear writing may eliminate or minimize head movement from one sector to another, both for writing and reading/searching. This technique saves time, in that more time is spent writing data and less time is spent moving the disk heads.

The techniques disclosed herein may be particularly suited to implementation on a RAID (Redundant Array of Independent Disks) device. A RAID device is a group of disks that appear to the operating system as a single disk device. RAIDS use a technique called striping to parcel out portions of data to each disk within the RAID so that data are spread across all of the disks in the RAID. Some RAIDs (known as level 0 or Level 10 RAIDS) stripe data across disks without redundancy; i.e., the data are written only once across the RAID. In these RAIDS, since data are being written across multiple devices, possibly concurrently, the physical speed of the writes to the disks becomes faster because data transfer is not constrained by the write speed of an individual disk. If one disk becomes busy writing a segment of data, the next disk in the RAID may be used to write the next segment or block of data.

By bypassing the operating system and file system overhead of the RAID, the stream disk driver can write data to the disk at the maximum speed the RAID allows, which is generally much faster than an individual disk allows.

Thus, embodiments of the above techniques may be implemented using a combination of hardware and software, where the hardware is a DASD (direct access storage device), and the software is the driver/algorithm (e.g., the stream disk driver 220, which may use or be implemented via an object code library, e.g., the StreamDisk™ library or functional equivalent) that ensures the DASD is used in optimal fashion for the writing of sequential data. The present system stores a stream of data on the DASD in a linear manner, which allows the system to obtain optimal speed (within some tolerance, of course) when storing data on the DASD.

Under normal circumstances (or in prior art approaches), DASDs may be used in a non-linear fashion, and use of the DASDs may typically be moderated by a file system which tries to make random access (non-linear) optimal on the device. However, the present approach takes a DASD that has inherently been optimized for non-linear (i.e., random or arbitrary) access, and optimizes it via software for efficient linear access. Another important optimization provided by the present techniques is insuring that only one writer is accessing the storage device at a time—only one application process is ever allowed to make changes to the DASD. While the one writer has exclusive access to the DASD, only it is allowed to write to the DASD. The one writer has exclusive access as long as it is streaming data to the DASD—typically the life of the process, i.e., the entire DASD (as opposed to just a partition of it) is not shared with other processes.

Thus, the present approach bypasses most, if not all, of the normal operating system protocols to access the DASD in order to enhance the writing of "linear" (or sequential) data, i.e., data that are presented as an unindexed stream (to the system, at least). As explained above, although in various cases, the data stream presented to the system may or may not have indexing information embedded within it, any indices in the data are not interpreted or understood by the present system (i.e., embodiments of the present hardware/ software combination disclosed herein). In other words, the present system is data agnostic (so long as it has (only) a single data type), and is not concerned with indexing within the data, although a consumer of the data (whatever is using the system) would presumably understand any internal indexing of the data stream. The system is only aware of the raw block address on the device to which it is writing next, and is specifically not aware of any metadata, indexing, or pointers within the data.

Moreover, in some embodiments, the stream disk driver implements an algorithm according to the above techniques that ensures the data stream is written optimally, in terms of transfer speed to the DASD. The algorithm ensures this by writing data to the next available block on the DASD without reference to file system markers, meta-data or indicia. For example, in one exemplary embodiment, the algorithm follows these simple steps for a write operation (writing streamed data to the DASD): A) choose the first block on the DASD as the last-block-written, B) write data to this last-block-written block and subsequently numbered blocks (i.e., begin with 1, write to 1, then 2, then 3, . . . until the data is written), C) remember, the last-block-written number, and D) upon the next write operation, choose the next block after the remembered last-block-number and jump to step B.

Summarizing key points from above:
1. Data received and stored on the DASD is sequential.
2. The stream disk driver ensures:
   a. only one writer exists, i.e. only one process has the ability to write data to the DASD, and this ability is not shared or transferred to other processes during the life of the process (i.e., during operation of the DASD).
   b. writes occur in sequential blocks (where, e.g., the stream disk driver converts stream to blocks).
   c. any and all file system protocols are bypassed—no file system is used by the DASD.
   d. there is only one write per block of data.
3. The block storage of the DASD is treated as one monolithic block addressable device—there are no subunits, sub-organization, or nodes.
4. The OS kernel is instructed that it is not allowed to write to the DASD.

Exemplary Benefits of the Present Techniques

Thus, embodiments of the above techniques may effectively omit or circumvent file systems by limiting writes and reads to linear operations, i.e., by removing the file system from the process altogether. The present approach is distinguished from other storage mechanisms such as Amazon S3 cloud storage, virtual disks, Logical Volumes, etc., at least because all of these systems store data using additional meta-data, and may store data on different devices and/or types of devices.

Primary benefits of the present techniques are not available using these prior art data storage methods and systems. Whereas a normal write to a file system (of any kind) may involve numerous reads and writes to various parts of a disk in order to keep the data organized, a write according to the present techniques requires exactly one write operation to a DASD, which has a number of benefits, including one or more of, but not limited to:

1) The read/write head of the disk always moves in a linear fashion which makes subsequent writes faster. The head does not move to other parts of a disk in-between writes because no meta-data is stored for the data.

2) The OS does not need to maintain meta-data for the data written to the disk and is freed to do other tasks, or to gather more data.

3) Data may be streamed to the disk at a rate of speed consistent with the physical limitations of the device. It is no longer constrained by other software based constraints such as the OS scheduler, maintenance of tables, etc.

4) A significant amount of additional data may be stored on the disk because no meta-data is being stored, e.g., as much as (or more than) 20% more data.

5) The stream disk driver (e.g., via the StreamDisk™ library) takes maximum advantage of hardware features such as read-a-head to improve throughput. In other words, the read-a-head of data afforded by most devices is actually used, because the types of data stored by the stream disk driver are very linear in nature.

Note, however, that some embodiments of the present techniques may have some limitations, such as:

1) The application utilizing the present techniques (e.g., the first application process) may be required to keep track of where data are stored on the DASD and how the data are organized—a function most applications usually rely upon the operating system to perform.

2) Some operating systems (e.g., Windows™, provided by Microsoft Corporation) are so file-system centric that their application programming interfaces are not well suited to applications that do not use a file system.

3) Generally, no other data may be stored on the device utilizing the present techniques because there is no file system to organize or otherwise differentiate this other data from the original data. As noted above, the DASD is specifically used for data storage of exactly one type or stream of data.

Figure 8:
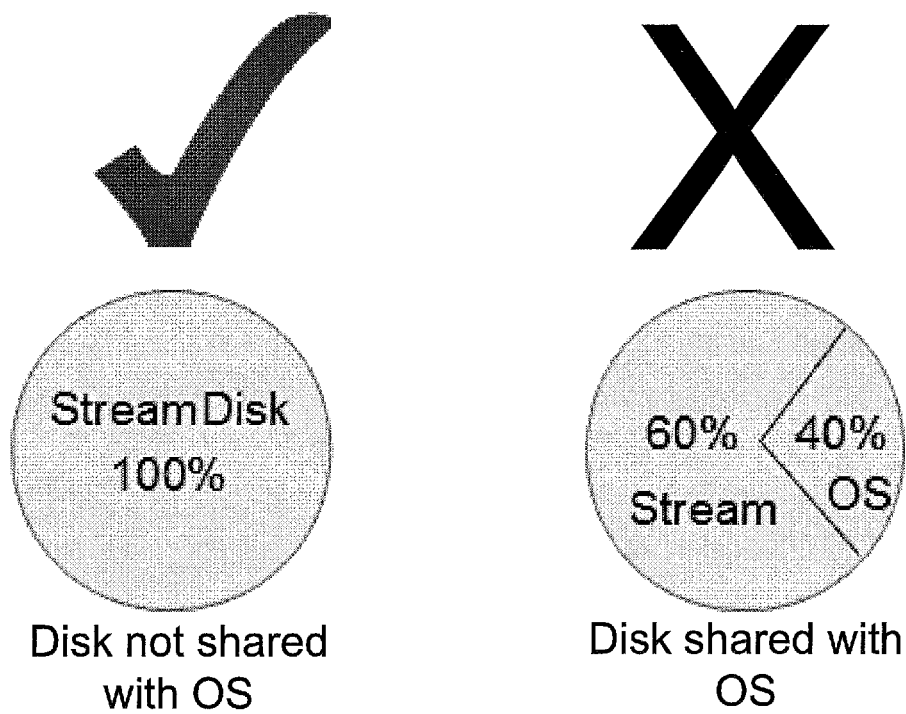
FIG. 8 illustrates an exemplary benefit of the present techniques applied to magnetic storage media, according to one embodiment.

It should be noted that with magnetic media benefits or increased data write speeds may be substantially improved only in configurations where the entire physical DASD device is reserved for use as described above. FIG. 8 illustrates benefits regarding the present techniques. As seen in FIG. 8A, regarding magnetic media (i.e., magnetic disk drives), either all media is reserved, as shown in the left image labeled "Disk not shared with OS", or no benefit is realized, as indicated by the large "X" in the right image labeled "Disk shared with OS", where the stream storage process shares 40% of DASD access with the OS. In this figure, embodiments of the present techniques are referred to as "StreamDisk", although, as noted above, this name is used for convenience only, and is not intended to limit embodiments of the invention to any particular form, function, or appearance. Thus, the techniques disclosed herein require exclusive access to the entire DASD.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for storing data, comprising:
 a computer performing:
  opening an unmounted unformatted direct access storage device (DASD) via an operation system (OS) application programming interface (API);
  determining a maximum amount of storage space afforded by the DASD;
  locking the DASD, thereby limiting write access to the DASD to a first application process and excluding writes to the DASD by any other application process;
  receiving a stream of data, wherein the data are of a single data type, and wherein said receiving is invoked by the first application process; and
  storing the stream of data on the DASD in a linear manner as it is received, wherein said storing does not use a file system architecture, metadata, indices, or keys associated with the data, wherein said storing comprises:
   writing a block of the stream of data to the DASD;
   returning a next contiguous write location on the DASD; and
   performing said writing and said returning multiple times in an iterative manner;
  placing a marker at the beginning of the DASD, thereby identifying the DASD and establishing an exclusive relationship between the first application process and the DASD;
  wherein the stored data are readable by multiple readers in a linear manner without using the file system architecture, metadata, indices, or keys.

2. The method of claim 1, wherein said performing said writing and said returning multiple times in an iterative manner comprises:
 wrapping back to the beginning of the DASD in response to the DASD being full.

3. The method of claim 2, wherein said wrapping comprises:
 indicating, by the next contiguous write location, the beginning of the DASD in response to the DASD being full; and
 writing an immediately subsequent block of the stream of data at the beginning of the DASD.

4. The method of claim 1, further comprising:
 halting said performing said writing and said returning in response to the DASD being full.

5. The method of claim 1, wherein the stream of data comprises network packets.

6. The method of claim 1, wherein the stream of data comprises geological data.

7. The method of claim 1, wherein said storing comprises:
 converting the received stream of data into blocks of data; and
 storing each block of data with a respective sequential write to the DASD;
 wherein said determining the maximum amount of storage space afforded by the DASD comprises determining a maximum number of blocks of data afforded by the DASD, and wherein each next contiguous write location is a raw block address on the DASD.

8. The method of claim 7, wherein said storing the stream of data on the DASD in a linear manner is performed by a software driver configured to optimize speed and throughput of the DASD for storing sequential data.

9. The method of claim 8, wherein to optimize speed and throughput of the DASD for storing sequential data, the software driver stores the blocks of data on the DASD at contiguous locations on the DASD, thereby minimizing mechanical movement of the DASD.

10. The method of claim 1, wherein the DASD is configured for access by one or more linear read processes, and wherein each linear read process is restricted to reading data from the DASD starting at the beginning of the DASD and reading the data in a linear manner.

11. A system for storing data, comprising:
 a computer, comprising:
  a processor; and
  a memory, coupled to the processor, wherein the memory stores program instructions; and
 a direct access storage device (DASD), coupled to the computer, wherein the DASD is initially unmounted and unformatted;
 wherein the program instructions are executable by the processor to:
  open the unmounted unformatted DASD via an operation system (OS) application programming interface (API);
  determine a maximum amount of storage space afforded by the DASD;
  lock the DASD, thereby limiting write access to the DASD to a first application process and excluding writes to the DASD by any other application process;
  receive a stream of data, wherein the data are of a single data type, and wherein said receiving the stream of data is invoked by the first application process; and
  store the stream of data on the DASD in a linear manner as it is received, wherein said storing does not use a file system architecture, metadata, indices, or keys associated with the data, wherein to store the stream of data on the DASD, the program instructions are executable to:
   write a block of the stream of data to the DASD;

return a next contiguous write location on the DASD; and perform said writing and said returning multiple times in an iterative manner;

place a marker at the beginning of the DASD, thereby identifying the DASD and establishing an exclusive relationship between the first application process and the DASD;

wherein the stored data are readable by multiple readers in a linear manner without using the file system architecture, metadata, indices, or keys.

12. The system of claim 11, wherein to implement said performing said writing and said returning multiple times in an iterative manner, the program instructions are executable to:

wrap back to the beginning of the DASD in response to the DASD being full.

13. The system of claim 12, wherein to wrap back to the beginning of the DASD in response to the DASD being full, the program instructions are executable to:

indicate, by the next contiguous write location, the beginning of the DASD in response to the DASD being full; and write an immediately subsequent block of the stream of data at the beginning of the DASD.

14. The system of claim 11, wherein the program instructions are further executable to:

halt said performing said writing and said returning in response to the DASD being full.

15. The system of claim 11, wherein the stream of data comprises network packets.

16. The system of claim 11, wherein the stream of data comprises geological data.

17. The system of claim 11, wherein to store the stream of data on the DASD in a linear manner, the program instructions are executable to:

convert the received stream of data into blocks of data; and store each block of data with a respective sequential write to the DASD;

wherein said determining the maximum amount of storage space afforded by the DASD comprises determining a maximum number of blocks of data afforded by the DASD, and wherein each next contiguous write location is a raw block address on the DASD.

18. The system of claim 17, wherein the program instructions implement a software driver configured to optimize speed and throughput of the DASD for storing sequential data, and wherein the software driver is executable to perform said storing the stream of data on the DASD in a linear manner.

19. The system of claim 18, wherein to optimize speed and throughput of the DASD for storing sequential data, the software driver stores the blocks of data on the DASD at contiguous locations on the DASD, thereby minimizing mechanical movement of the DASD.

20. The system of claim 11, wherein the DASD is configured for access by one or more linear read processes, and wherein each linear read process is restricted to reading data from the DASD starting at the beginning of the DASD and reading the data in a linear manner.

21. A non-transitory computer accessible memory medium that stores program instructions executable by a processor to:

open an unmounted unformatted direct access storage device (DASD) via an operation system (OS) application programming interface (API);

determine a maximum amount of storage space afforded by the DASD;

lock the DASD, thereby limiting write access to the DASD to a first application process and excluding writes to the DASD by any other application process;

receive a stream of data, wherein the data are of a single data type, and wherein said receiving the stream of data is invoked by the first application process; and store the stream of data on the DASD in a linear manner as it is received, wherein said storing does not use a file system architecture, metadata, indices, or keys associated with the data, wherein to store the stream of data on the DASD, the program instructions are executable to:

write a block of the stream of data to the DASD;

return a next contiguous write location on the DASD; and perform said writing and said returning multiple times in an iterative manner;

place a marker at the beginning of the DASD, thereby identifying the DASD and establishing an exclusive relationship between the first application process and the DASD;

wherein the stored data are readable by multiple readers in a linear manner without using the file system architecture, metadata, indices, or keys.

* * * * *